US011228695B2

(12) United States Patent
Berst et al.

(10) Patent No.: US 11,228,695 B2
(45) Date of Patent: Jan. 18, 2022

(54) CAMERA ENCLOSURES AND END EFFECTORS

(71) Applicant: Components Express, Inc., Woodridge, IL (US)

(72) Inventors: John Berst, Woodridge, IL (US); Art Didyk, Chicago, IL (US); Nick DeFrancesco, Sugar Grove, IL (US)

(73) Assignee: Component Express Inc, Woodridge, IL (US)

( * ) Notice: Subject to any disclaimer, the term of this patent is extended or adjusted under 35 U.S.C. 154(b) by 0 days.

(21) Appl. No.: 17/234,572

(22) Filed: Apr. 19, 2021

(65) Prior Publication Data
US 2021/0243340 A1 Aug. 5, 2021

Related U.S. Application Data

(63) Continuation of application No. 16/543,549, filed on Aug. 17, 2019, now Pat. No. 11,012,596.

(60) Provisional application No. 62/724,335, filed on Aug. 29, 2018.

(51) Int. Cl.
*B23P 19/04* (2006.01)
*H04N 5/225* (2006.01)
*G03B 15/03* (2021.01)
*G03B 17/08* (2021.01)

(52) U.S. Cl.
CPC .......... *H04N 5/2252* (2013.01); *B23P 19/04* (2013.01); *G03B 15/03* (2013.01); *G03B 17/08* (2013.01); *H04N 5/2254* (2013.01); *H04N 5/2256* (2013.01); *G03B 2215/056* (2013.01); *Y10T 29/49826* (2015.01)

(58) Field of Classification Search
CPC ............ Y10T 29/49826; H04N 5/2252; H04N 5/2256; H04N 5/2254
See application file for complete search history.

(56) References Cited

U.S. PATENT DOCUMENTS

2002/0140848 A1* 10/2002 Cooper ................ H04N 5/2252
 348/373
2004/0064018 A1* 4/2004 Dunki-Jacobs .......... A61B 1/07
 600/178

* cited by examiner

Primary Examiner — Jason L Vaughan
Assistant Examiner — Amanda Kreiling
(74) Attorney, Agent, or Firm — Chris Tanner; FYPA PLLC

(57) ABSTRACT

Various embodiments of enclosures for machine-vision cameras are disclosed. The enclosures are designed to fit\hug the camera to be as small as physically possible, and also integrate other features such as better cabling, IP-67 compliance, and end-effectors. Further, the embodiments herein have also integrated a way to mount extra lights as part of the design. The embodiments herein accommodate the specific need of the particular application. The embodiments herein can accommodate numerous shapes and sizes of cameras, including square, cylindrical, or cubical cameras, and encompass either rectangular or round enclosures.

16 Claims, 24 Drawing Sheets

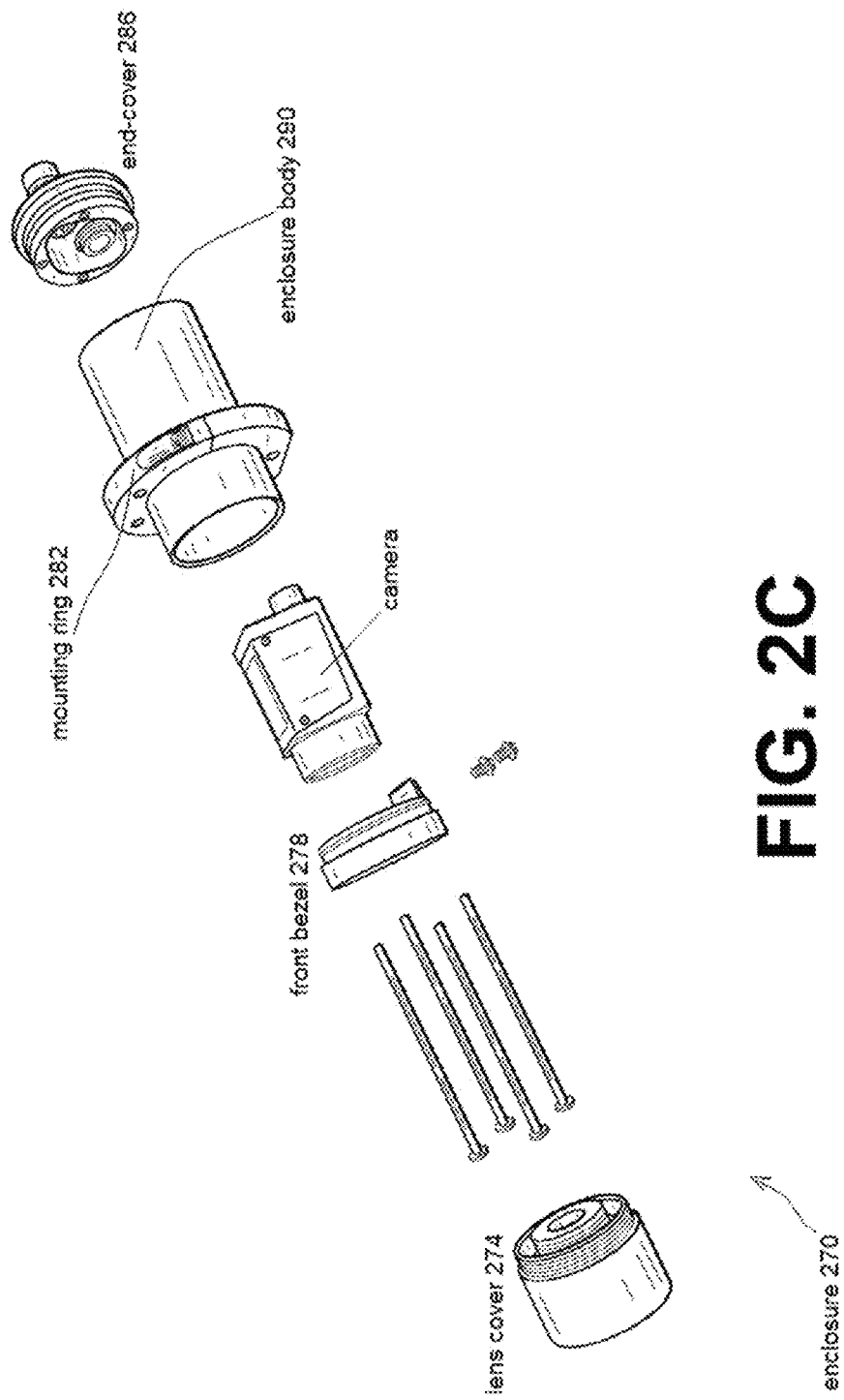

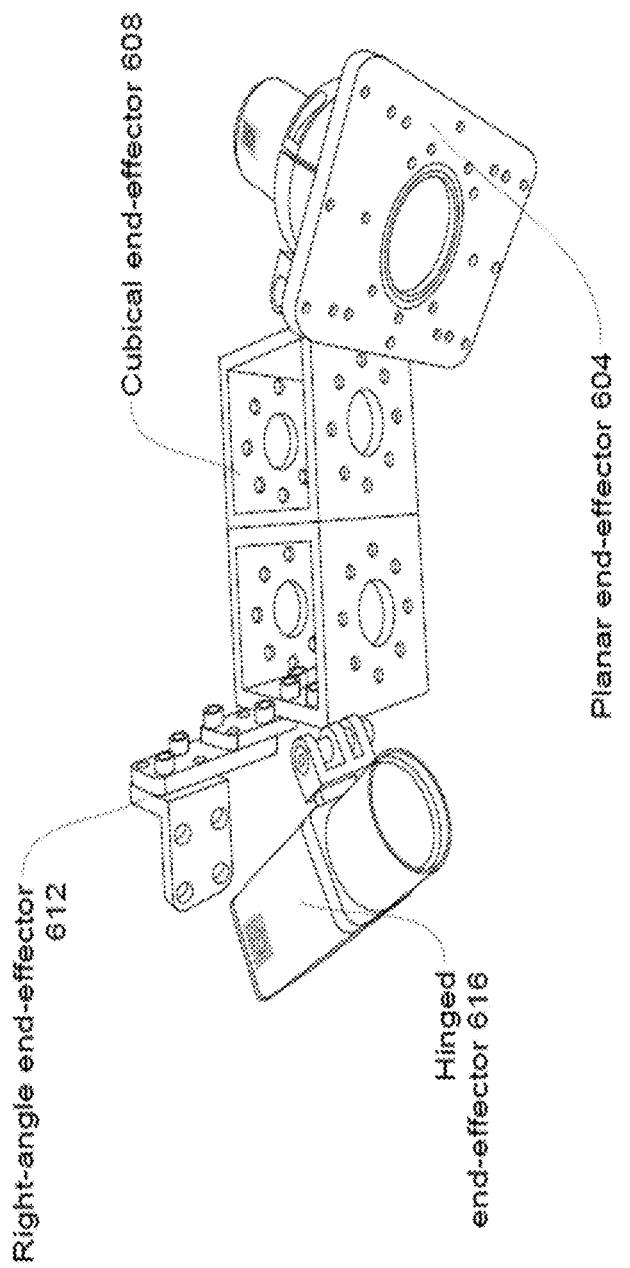
FIG. 6 (Types of end-effectors)

CAMERA ENCLOSURES AND END EFFECTORS

BACKGROUND OF THE INVENTION

Cord grips usually extend around a wire, squeezes down upon that wire, and cause the wire and the surrounding area to be watertight. Cord grips are sometimes known as grommets.

There are several disadvantages to such an arrangement. These grommets or cord grips have to be very large, which makes them very expensive, and they must accommodate not just a wire-width but also a connector-width (if the wire has a connector on the end). Very few users want to remove the connector and then re-attached it once a cord grip is attached.

Consequently, a cord grip must be extra-giant size, and then, one must "rubber up" to make up for that extra size, to get down to the diameter of the cable. This adds to manufacturing costs.

Further, cord-gripping itself the squeezing of the cable is damaging to the cable, both physically and electrically. This is a testable and provable fact. Someone can put a wire on a piece of testing equipment, they can then squeeze the wire, and the instrument will clearly note changes in the electrical properties of the wire.

FIGS. 1A (Prior Art) and 1B (Prior Art) show non-limiting examples of cord grips. It is well-established that cord grips are bad for twisted pairs, or any sort of high speed data cabling. Cord grips also can cause reflection, signal degradation, standing waves, adjacent channel interference, and cross-talk, if not outright cable breakage. Cord grips also leak humidity and moisture and heat (both directions), such that a machine-vision camera can be destroyed. It's also time-consuming for a customer to replace a failed cable when it finally succumbs to the forces of the cord grip.

SUMMARY OF THE INVENTION

This disclosure discusses at least two separate embodiments and several sub-embodiments. The first embodiment is an enclosure, such as but not limited to being used for machine-vision cameras, which eliminates cord grips and solves other problems. The second embodiment is an end effector which can be manufactured directly into that enclosure, or be connected therewith.

DETAILED DESCRIPTION OF THE DRAWINGS

Figure 3A:
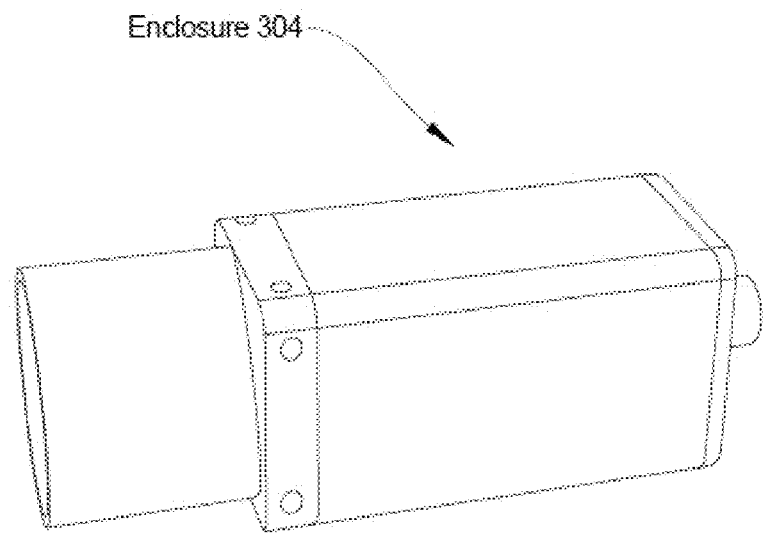
Figure 3B:
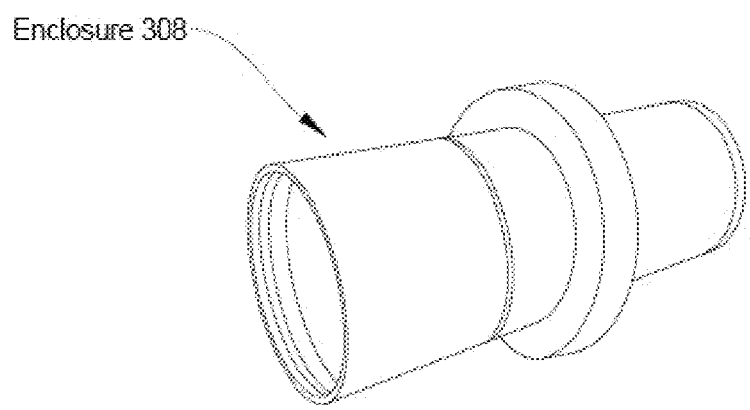
Figure 4:
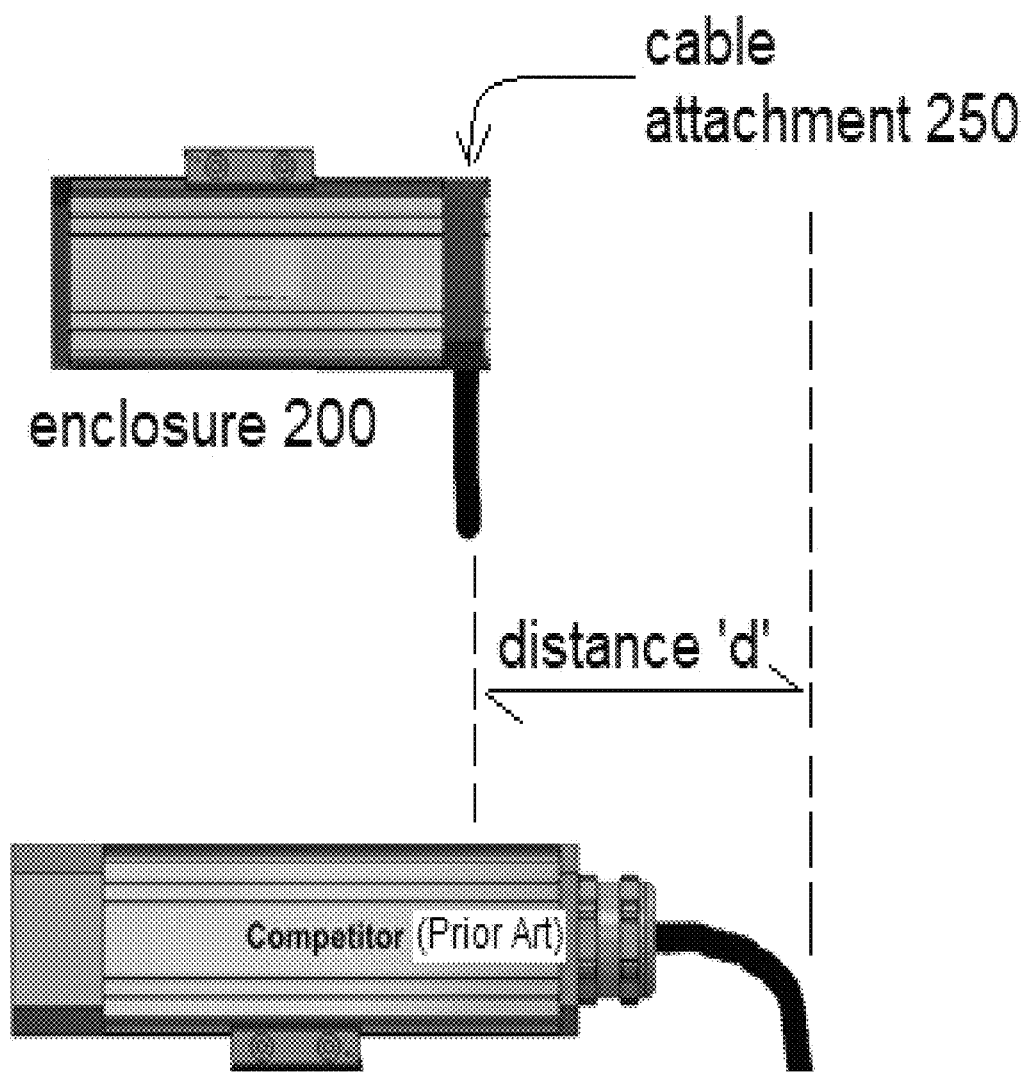
Figure 5A:
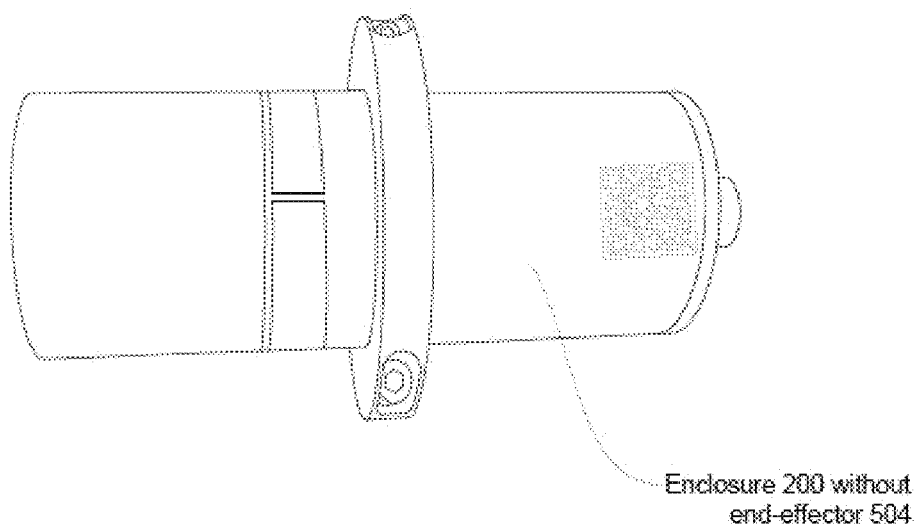
Figure 5B:
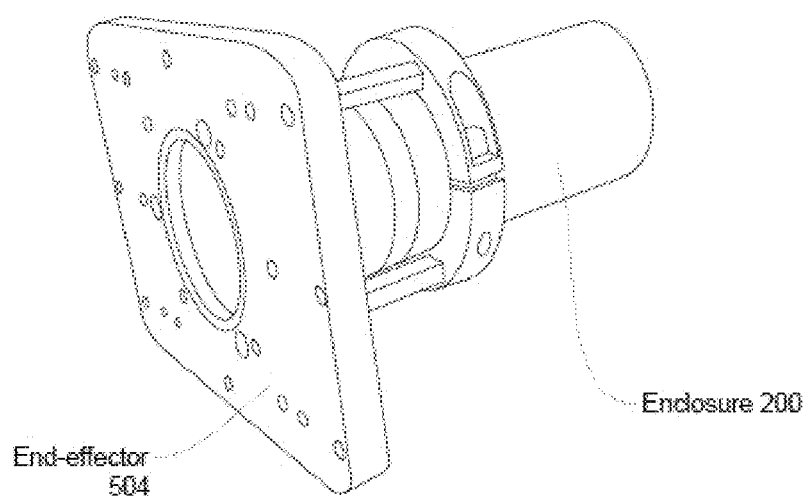

FIGS. 2C, 2D, 2E, 2F, 2G, and 2H show detail of an example enclosure;

FIGS. 3A and 3B show an embodiment of a case\enclosure that is small, inexpensive, and IP67-compliant in rectangular (FIG. 3A) or round (FIG. 3B) cross-section;

FIG. 4 shows an embodiment of an enclosure noticeably smaller and better designed in comparison to a competitor's case;

FIGS. 5A and 5B show an enclosure without (FIG. 5A) and with (FIG. 5B) an end-effector.

Figure 7A:
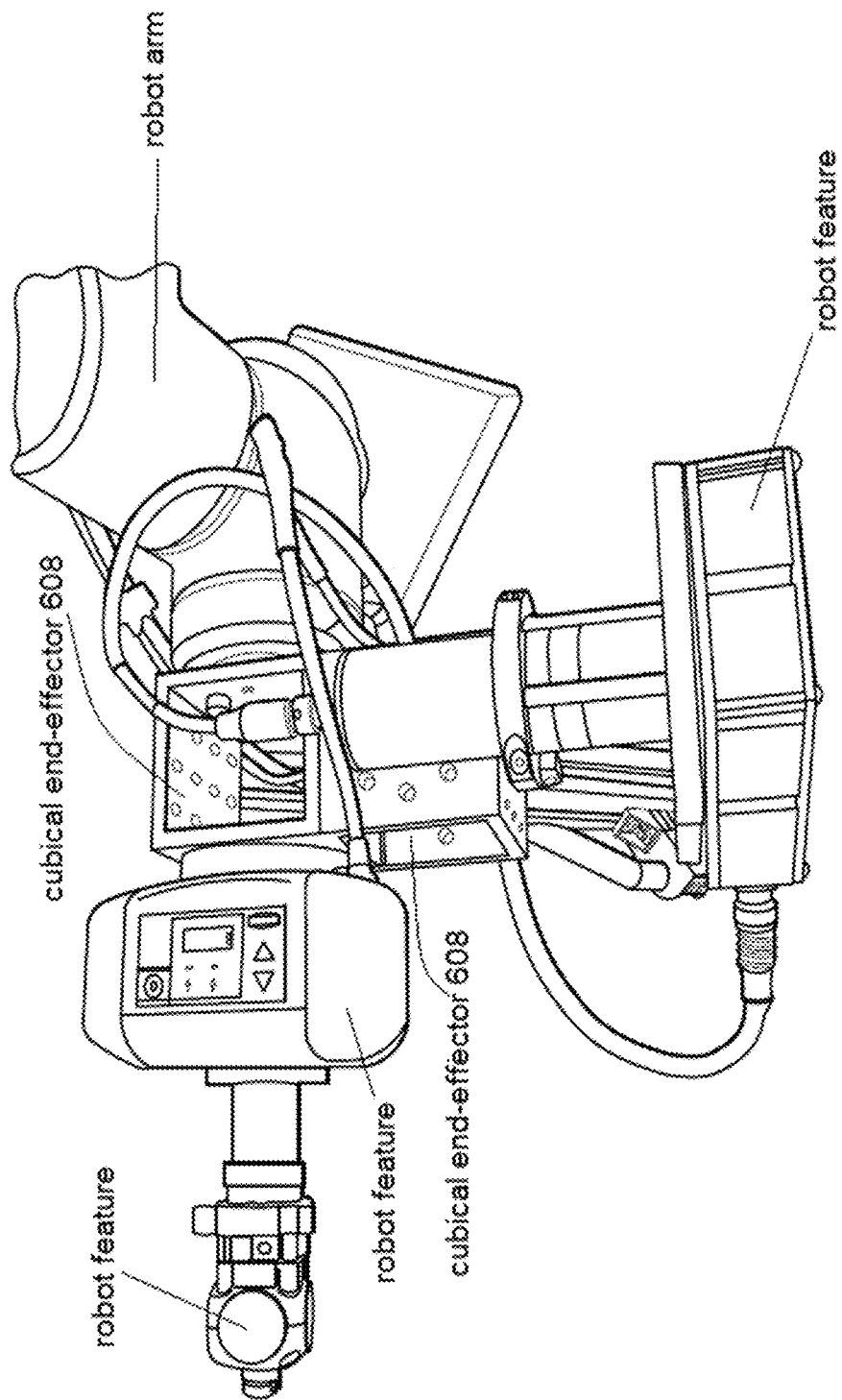
Figure 7B:
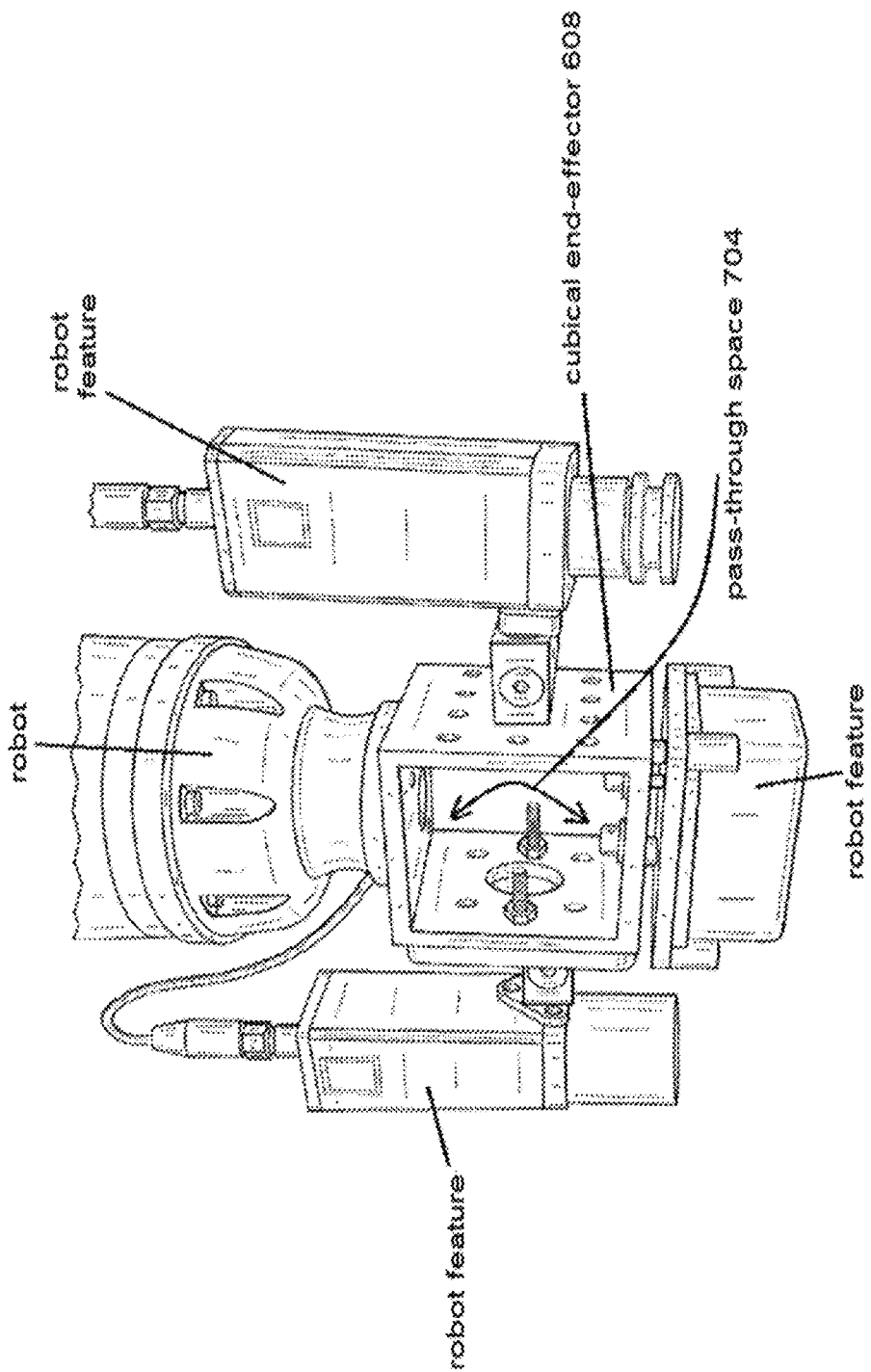
Figure 8A:
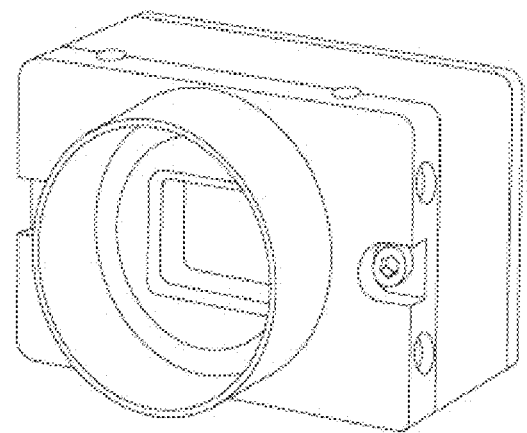
Figure 8B:
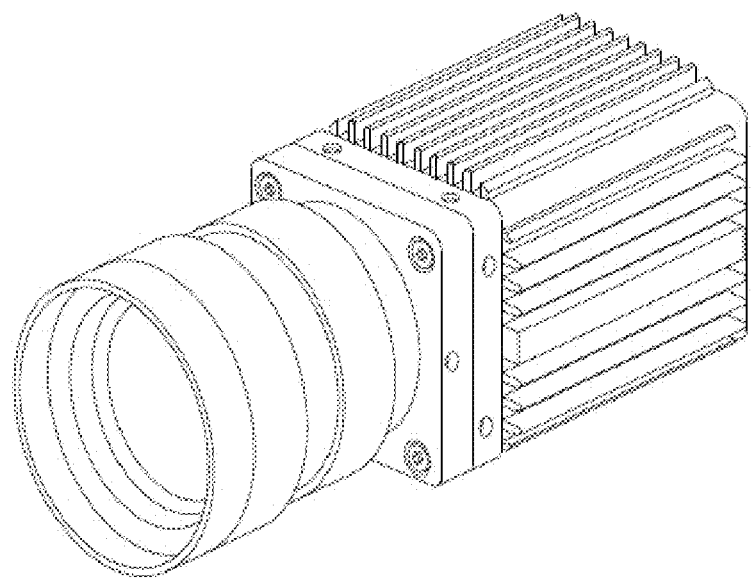
Figure 9:
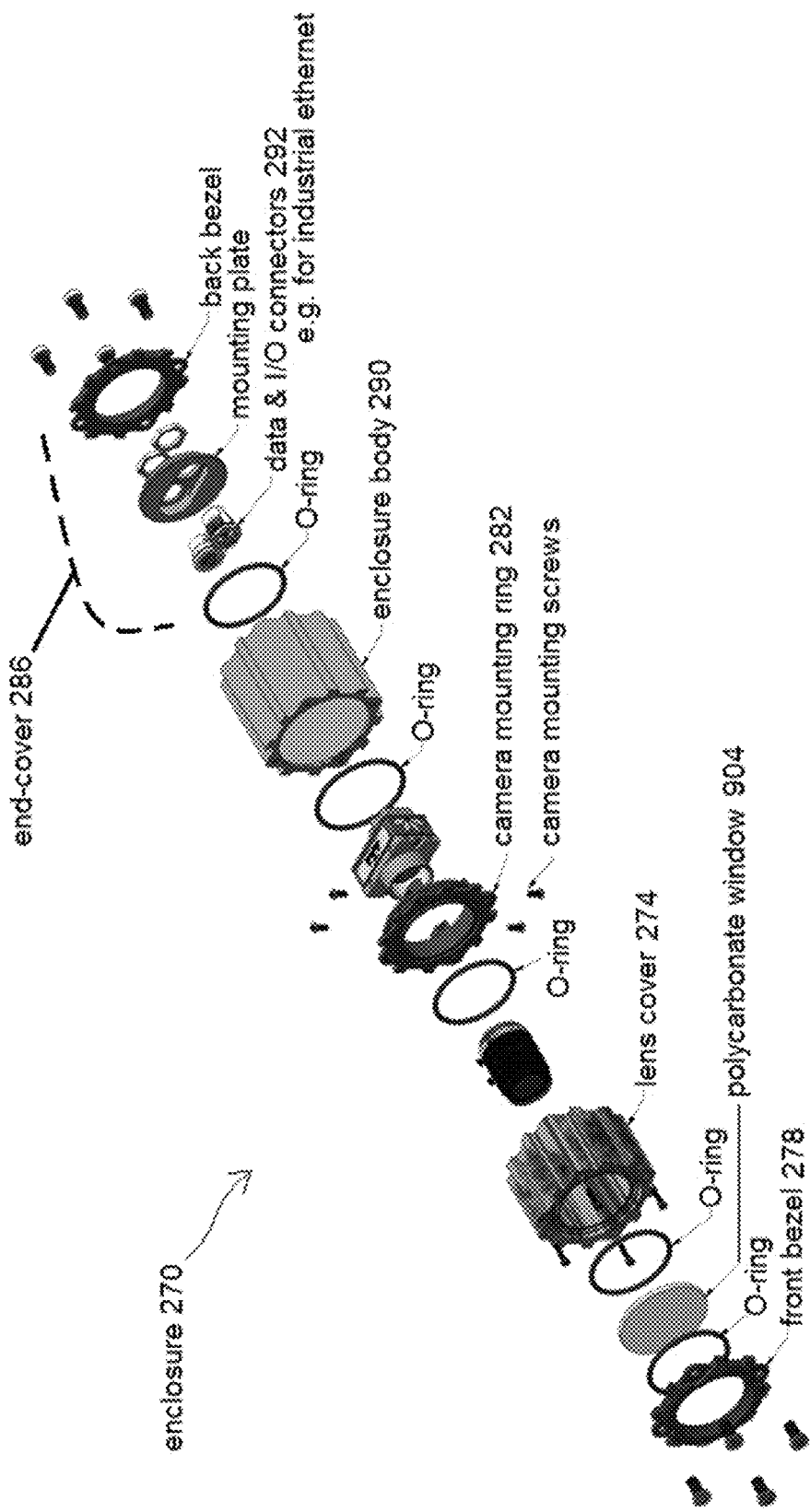
Figure 10A:
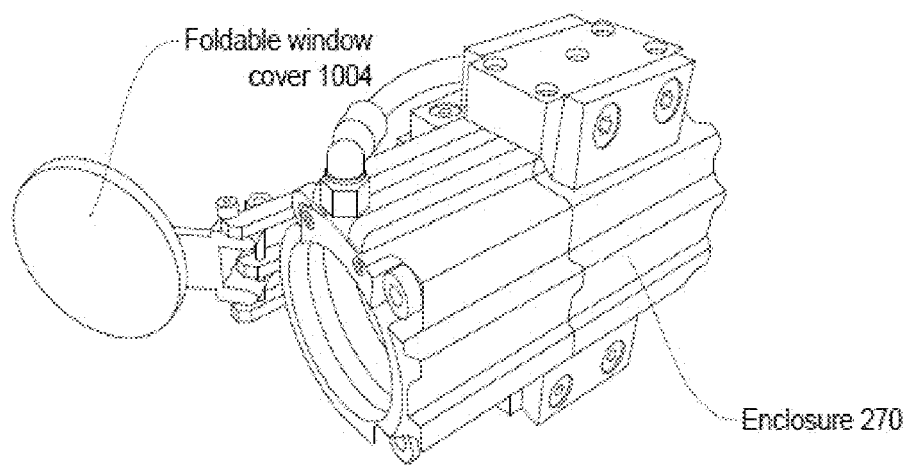
Figure 10B:
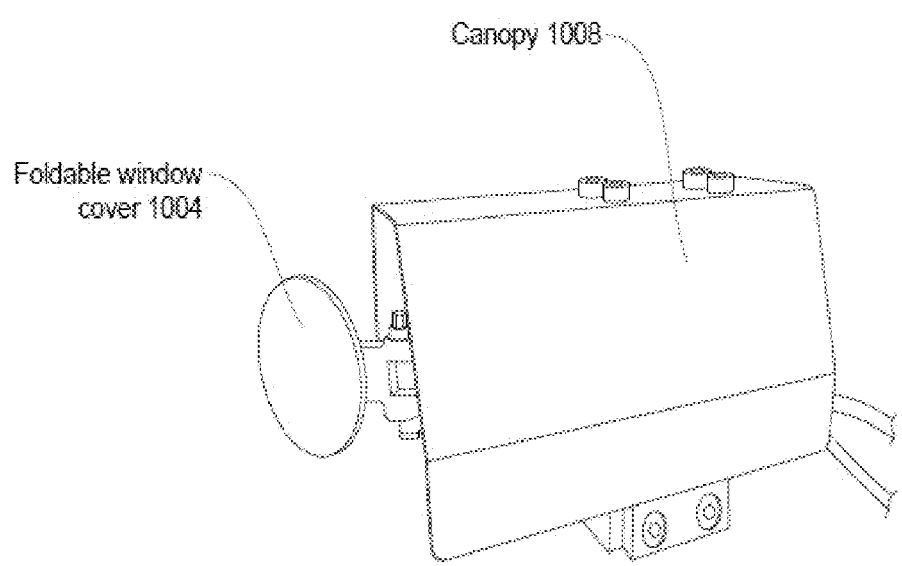
Figure 11A:
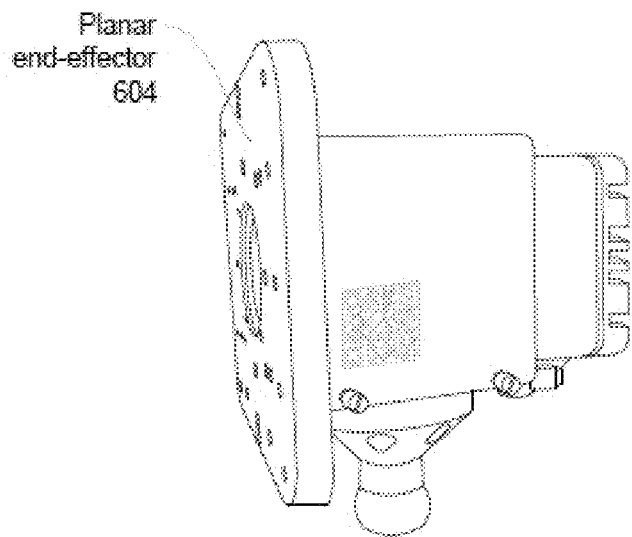
Figure 11B:
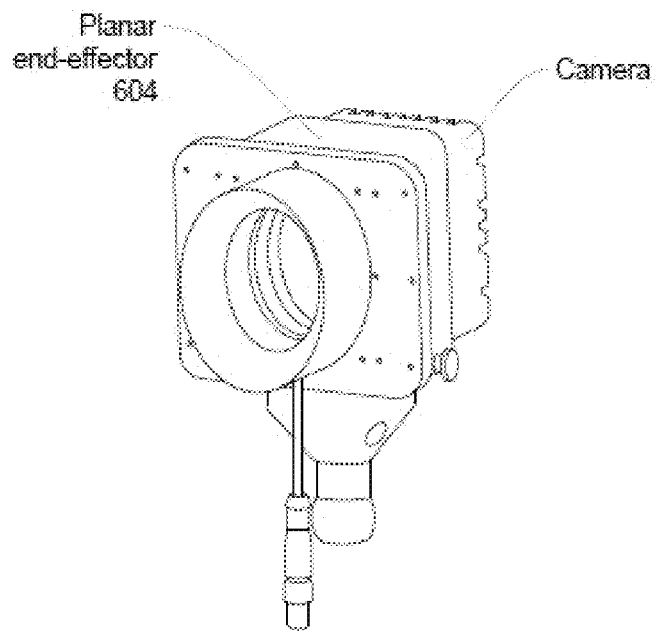
Figure 12:
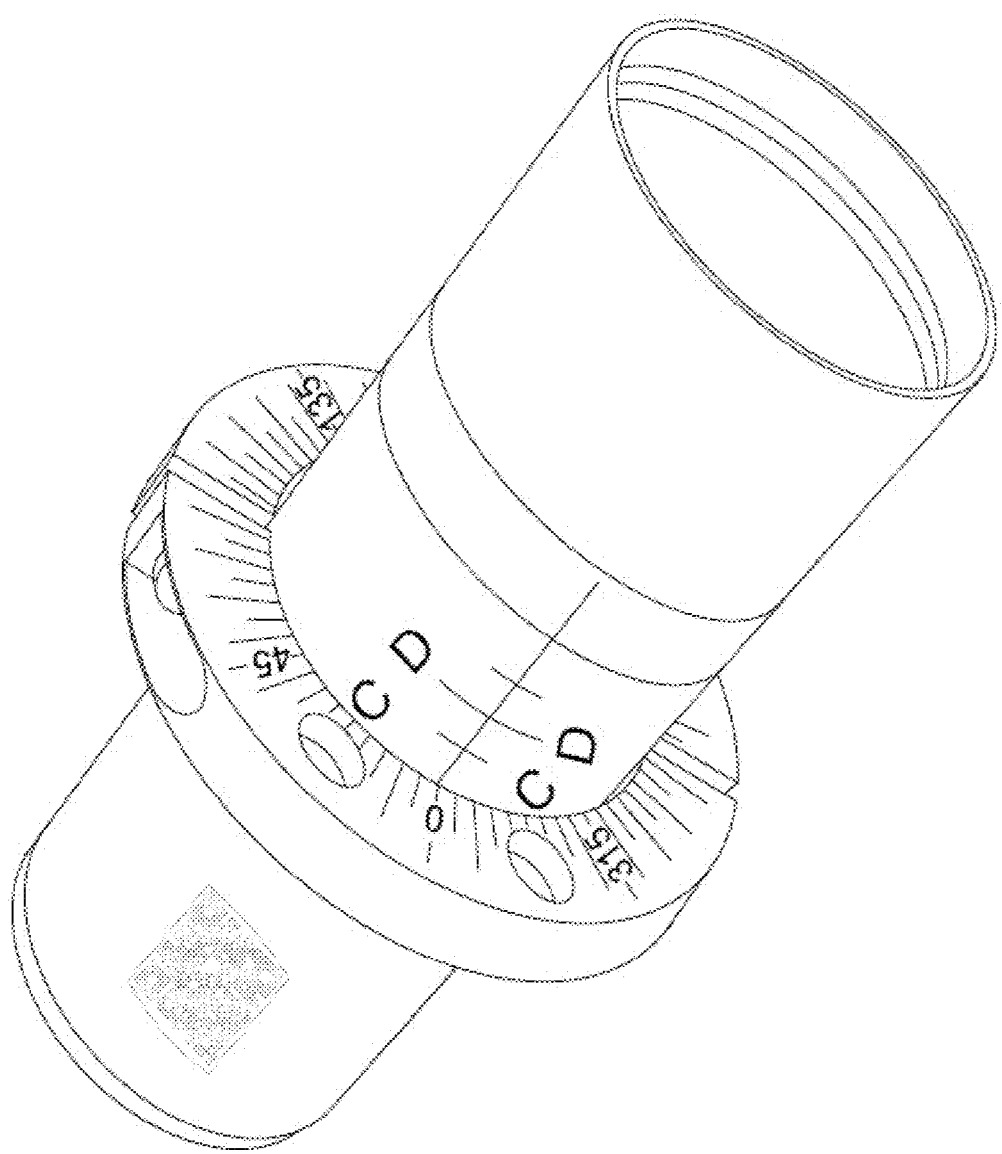
Figure 13:
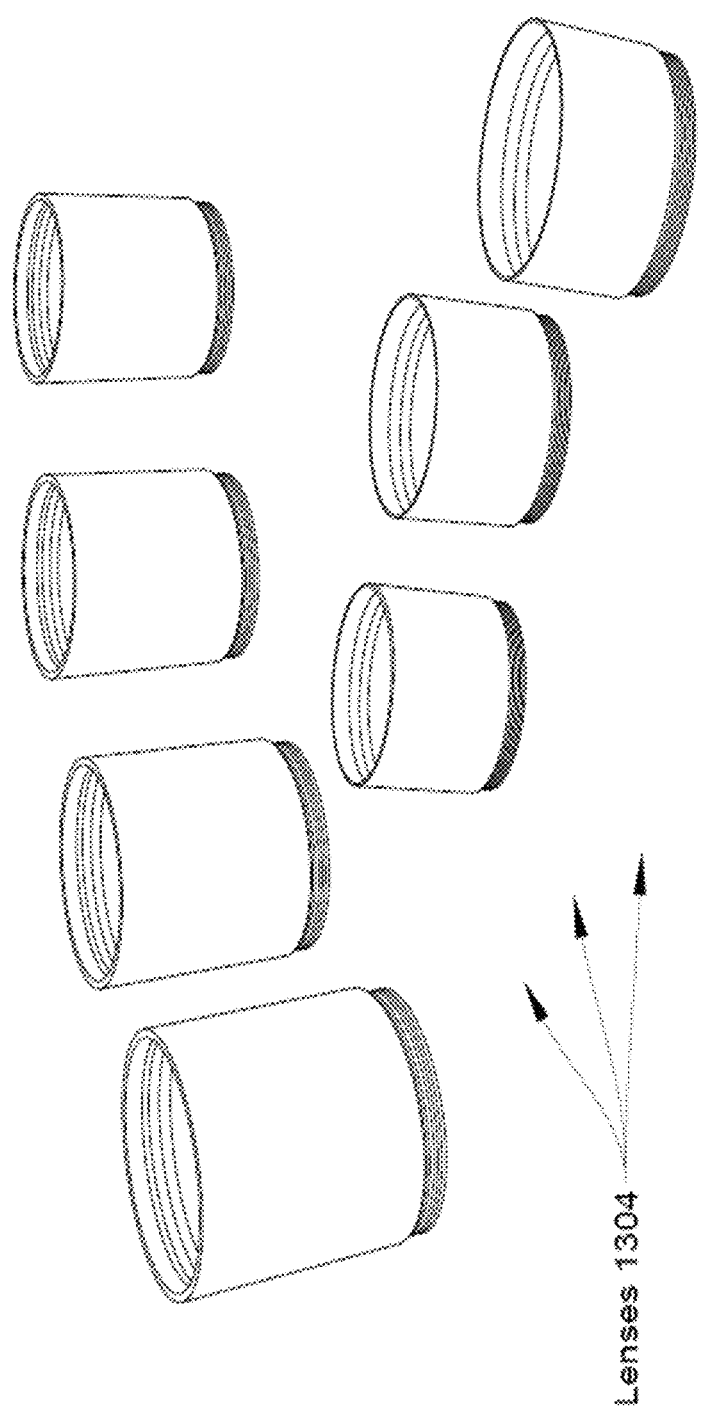
Figure 14:
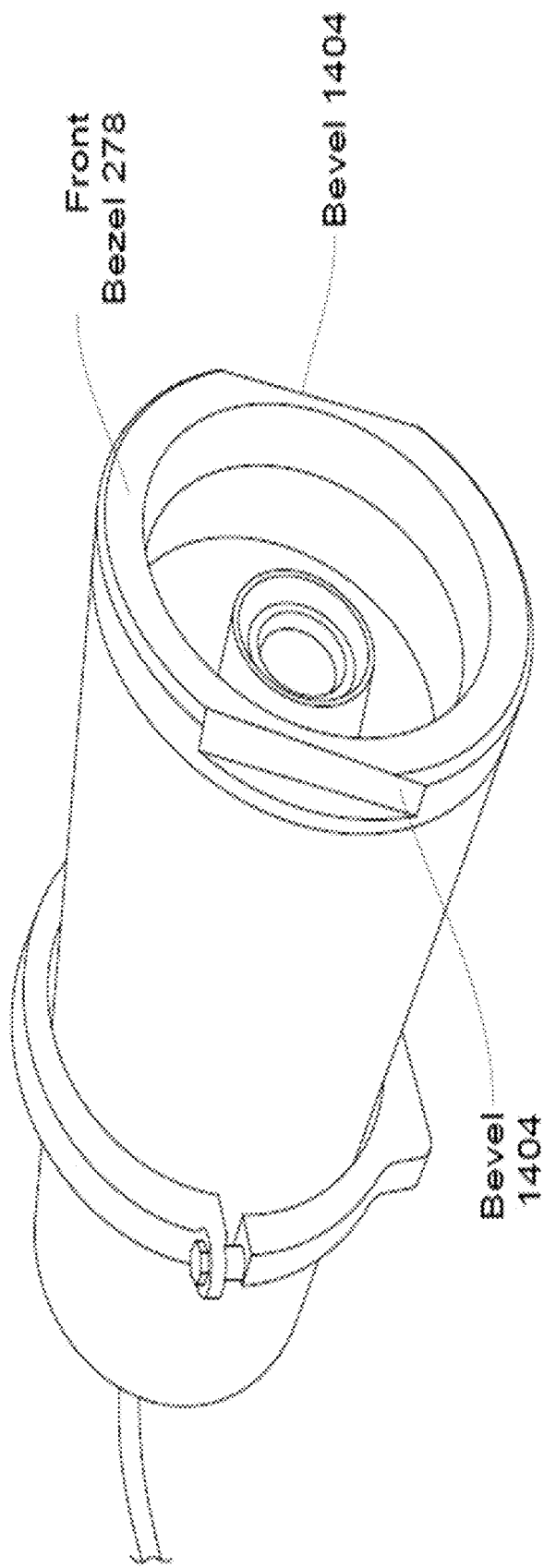
Figure 15:
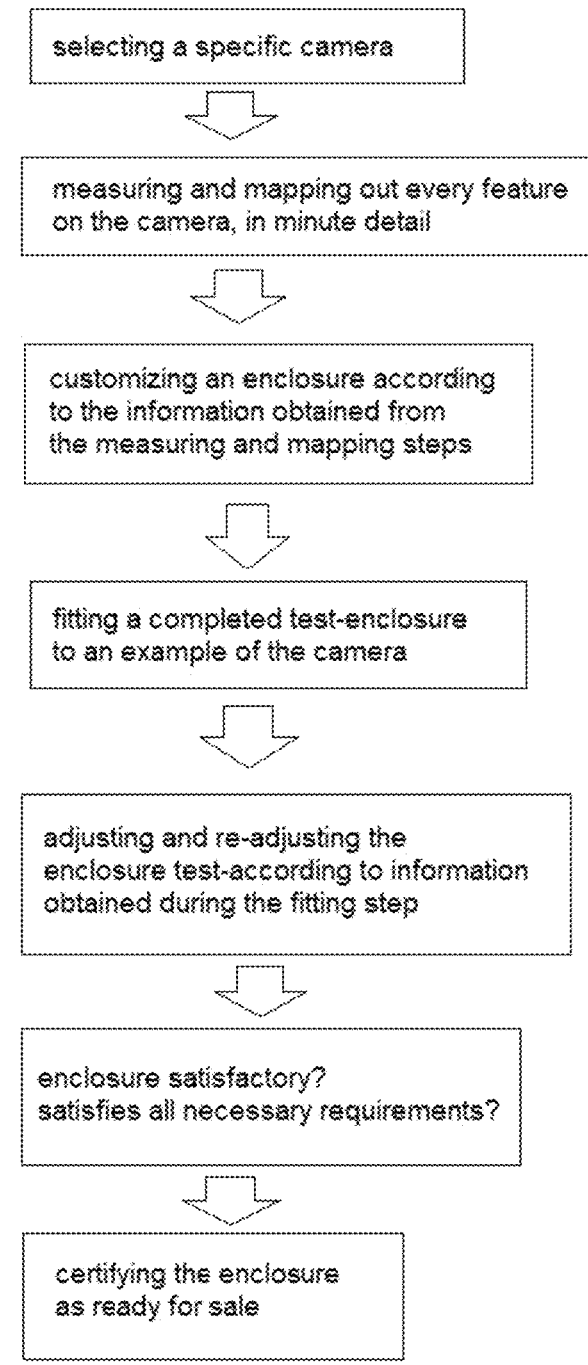
Figure 16C:
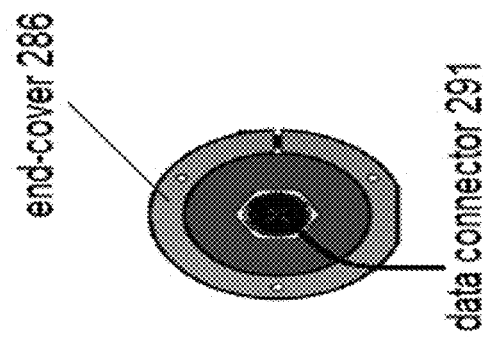
Figure 16B:
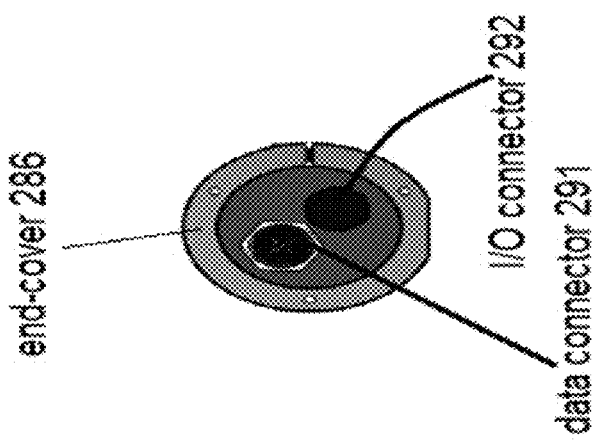
Figure 16A:
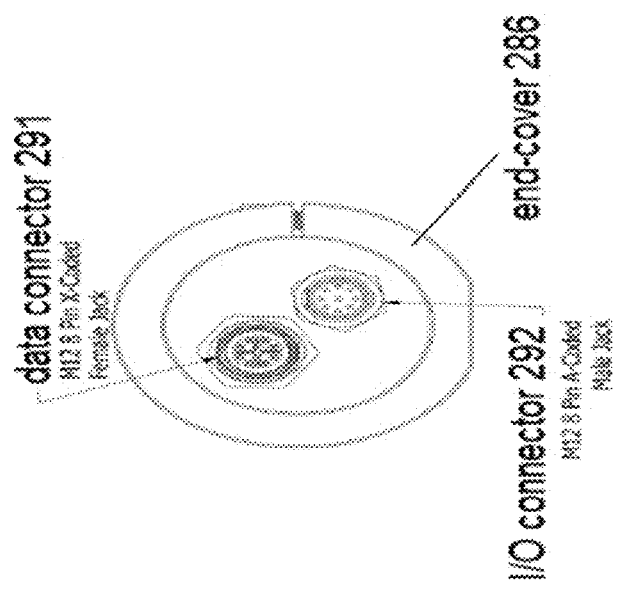

FIG. 6 shows several example end effectors;

FIGS. 7A and 7B show examples of end-effectors attached to robot arms;

FIG. 8A (Prior Art) shows an example Genie Nano camera, while FIG. 8B (Prior Art) shows an Imperx Bobcat camera;

FIGS. 9 and 14 show various views of a case/enclosure adaptable to the Imperx Bobcat camera of FIG. 8A;

FIGS. 10A and 10B shows an example case/enclosure adapted to a camera;

FIGS. 11A and 11B shows a case/enclosure adapted to a Matrox GT-R camera and including a planar end-effector;

FIG. 12 shows example markings on an attachment ring and an enclosure body;

FIG. 13 shows example lenses for attachment not to the camera but to the front bezel of an enclosure;

FIG. 14 shows example bevels necessary to make an embodiment work for a specific customer;

FIG. 15 shows an example flowchart detailing the process of fabricating an enclosure for a specific camera; and FIGS. 16A, 16B, and 16C show detail about the industrial ethernet connector.

DETAILED DESCRIPTION OF THE PREFERRED EMBODIMENTS

The cameras used with the embodiments herein are suitable for high-tech, highly industrial applications, and are sometimes called machine vision cameras. Such cameras may have high megapixel counts, high frame rate, and be used for demanding, complex tasks.

Machine Vision Cameras are not Just Cameras

It is important to note that machine vision cameras are not just regular cameras, as they may be working at a much higher frame-rate, far above that perceived by the human eye. Machine vision cameras work with robots and other machinery that may be moving at speeds faster than a human eye can perceive, with a higher frame rate, higher resolutions, lower light, including but not limited to lighting and features that is not in the human-visible wavelength spectrum.

As such, the enclosures described herein must factor in considerations that go beyond conventional cameras, including working in hostile environments. Additionally, the machine vision cameras discussed herein often communicate at very high bandwidth, e.g. requiring industrial ethernet connectors, of which the X-code M12 is but one example. It is important that the enclosures described herein, e.g. enclosures 200, 270 ensure that data-flow through these connectors not be impaired or impeded in any way.

Another consideration is that an enclosure body e.g. enclosure body 290 might need to be made from a non-conductive material. A robot or other machine-device may be generating, or very sensitive to various electrical and electronic and electro-magnetic factors. An enclosure that is non-conductive can be helpful in improving the performance of the camera enclosed therein.

A similar problem occurs with heat dissipation. The machine vision cameras may be operating in a very hot environment, and being over-heated can affect the performance of sensitive electronic equipment such as machine vision cameras. Thus, with environmental heat nearby, plus the fact that machine vision cameras may generate a significant amount of their own heat, it can be advantageous for the enclosure 270 to have heat-dissipating properties.

A very significant consideration is in adjusting the machine vision cameras upon which the enclosures discussed herein are attached. These machine vision cameras sometimes require adjustment, but to save money and improve efficiency, it is often optimal to make focus-adjustments by hand without moving any camera-mount. While remote-focusing of machine vision cameras exists, the cameras discussed herein (e.g. FIGS. 8A-8B (Prior Art)) should be assumed to not have remote focusing.

One distinguishing factor of the case\enclosure embodiments herein is that they go beyond typical enclosures for machine vision cameras. That is, it is well-known that most embodiments of case\enclosures are largely generic, being made to assist a precision instrument such as a machine vision camera in a dirty environment, or high temperature, or cold, or where welding is occurring. The main purpose is usually just exposure protection for the camera, most cameras operated best in a nice clean environment, close to what is suitable for operating a typical laptop computer. It might be unwise for someone to put a computer just by itself without extra stuff in an industrial environmental, with, for example, welding happening nearby, or a production line, or outdoor work, e.g. agriculture, etc. Consequently, a conventional enclosure may also protect devices from water, humidity, dust, vibration, and\or temperature. One way to describe these might be "universal enclosures".

Customers are getting using more and more usages and purposes for their machine vision cameras, and potentially becoming dis-satisfied with their existing solutions for universal enclosures. They might be too heavy, or too large. The enclosure might have been made large in order to achieve a 1-size-fits-all effect.

Next, there are at least two things one must always achieve with an enclosure:
1) get light to the cameras inside the enclosure (IOW get the picture into the camera), which entails a window or aperture at one end of the enclosure. Different customers may have different requirements for such a window, including e.g. what kind of material the window can be made out of, the properties of the window, in order to properly accommodate the various types of optical things that happen with the window; and
2) get the signals and the power for the camera in and out of the case\enclosure.

To achieve 2), conventional enclosures may use the cord grip discussed earlier, e.g. waterproof electrical fittings, which may or may not incorporate a rubber grommet. To avoid using cord grips, the embodiments herein either integrate connectors directly onto the body of the enclosures, so that the signals come out through a proprietary watertight connector so to facilitate putting regular cables right onto the enclosure and then get to the inside with a built-in portion of the enclosure itself. Second, the embodiments herein may actually integrate the cable itself right the design of the enclosure. Either using a cable, or a type of fixed "bus", molded/machined directly into the interior of the case/enclosure.

The embodiments of case\enclosures described herein are designed to fit\hug the camera to be as small as physically possible. The embodiments of case\enclosure herein also integrate other things. With machine vision cameras, there are often also lighting issues. Many manufacturing environments taking advantage of machine vision have special lights for these cameras, that basically comprise a hole in the middle of the camera. Such a light surrounds the lens by 360°, so they can effectively light a work-surface, with no shadows.

The embodiments herein have also integrated a way to mount extra lights as part of the design. The embodiments herein accommodate the specific need of the particular application.

Lots of camera-sizes exist, including cameras that resemble 29 mm cubes. Some example cameras are shown in FIGS. 8A (Prior Art) and 8B (Prior Art). As shown at least within FIGS. 3A and 3B, the embodiments herein include both round and rectangular shapes for cubical cameras and many other camera-shapes. Some customers want the rectangular enclosure 304, while others want the round enclosure 308.

Advantages of the case/enclosure shown in FIGS. 3A and 3B include, but are not limited to: low weight, e.g. 170$g$, 370$g$ when assembled with mount/camera; a built in connector (no cord grip); half the size of the competitors case (see FIG. 4); being mountable in any direction; facilitates mounting of lights thereto; alignment markings; and a QR code so that technicians could find technical data on the product.

Next, conventional enclosures can be too large, but can also be too heavy. If put in a device or robot that is moving or other kind of machine vision application, the embodiments herein can be machined from e.g. lightweight aluminum, and thus minimizing amount of space taken up. These also means less material used, which makes them lighter and thus another benefit to customers.

At this time, it is important to explain IP67 standards.

The IP Code (or International Protection Rating, sometimes also interpreted as Ingress Protection Rating) consists of the letters IP followed by two digits and an optional letter. As defined in international standard IEC 60529, it classifies the degrees of protection provided against the intrusion of solid objects (including body parts like hands and fingers), dust, accidental contact, and water in electrical enclosures. The standard aims to provide users more detailed information than vague marketing terms such as waterproof.

The digits (characteristic numerals) indicate conformity with the conditions summarized in the tables below. For example, an electrical socket rated IP22 is protected against insertion of fingers and will not be damaged or become unsafe during a specified test in which it is exposed to vertically or nearly vertically dripping water. IP22 or 2X are typical minimum requirements for the design of electrical accessories for indoor use.

Within this disclosure, a key factor of concern will be IP67 compliance.

First Digit: Solids

The first digit indicates the level of protection that the enclosure provides against access to hazardous parts (e.g., electrical conductors, moving parts) and the ingress of solid foreign objects.

| Level | Object size protected against | Effective against |
| --- | --- | --- |
| 0 | Not protected | No protection against contact and ingress of objects |
| 1 | >50 mm | Any large surface of the body, such as the back of the hand, but no protection against deliberate contact with a body part. |
| 2 | >12.5 mm | Fingers or similar objects. |
| 3 | >2.5 mm | Tools, thick wires, etc. |
| 4 | >1 mm | Most wires, screws, etc. |

-continued

| Level | Object size protected against | Effective against |
|---|---|---|
| 5 | Dust Protected | Ingress of dust is not entirely prevented, but it must not enter in sufficient quantity to interfere with the satisfactory operation of the equipment; complete protection against contact. |
| 6 | Dust Tight | No ingress of dust; complete protection against contact. |

Second Digit: Liquids
Protection of the equipment inside the enclosure against harmful ingress of water.

| Level | Object size protected against | Effective against |
|---|---|---|
| 0 | Not protected- | |
| 1 | Dripping water | Dripping water (vertically falling drops) shall have no harmful effect. |
| 2 | Dripping water when tilted up to 15° | Vertically dripping water shall have no harmful effect when the enclosure is tilted at an angle up to 15° from its normal position. |
| 3 | Spraying water | Water falling as a spray at any angle up to 60° from the vertical shall have no harmful effect. |
| 4 | Splashing water | Water splashing against the enclosure from any direction shall have no harmful effect. |
| 5 | Water jets | Water projected by a nozzle (6.3 mm) against enclosure from any direction shall have no harmful effects. |
| 6 | Powerful water jets | Water projected in powerful jets (12.5 mm nozzle) against the enclosure from any direction shall have no harmful effects. |
| 7 | Immersion up to 1 m | Ingress of water in harmful quantity shall not be possible when the enclosure is immersed in water under defined conditions of pressure and time (up to 1 m of submersion). |

Figure 1A:
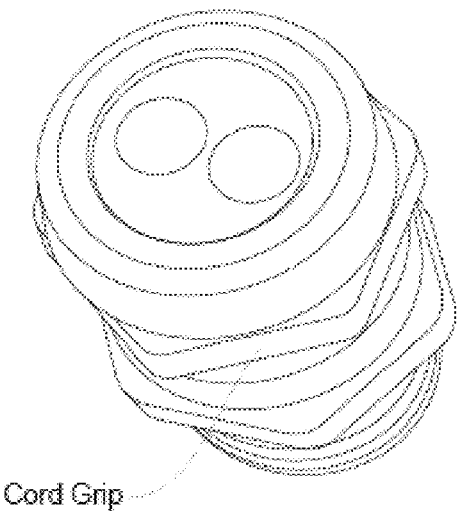
FIGS. 1A and 1B (Prior Art) show examples of cord grips.
Figure 1B:
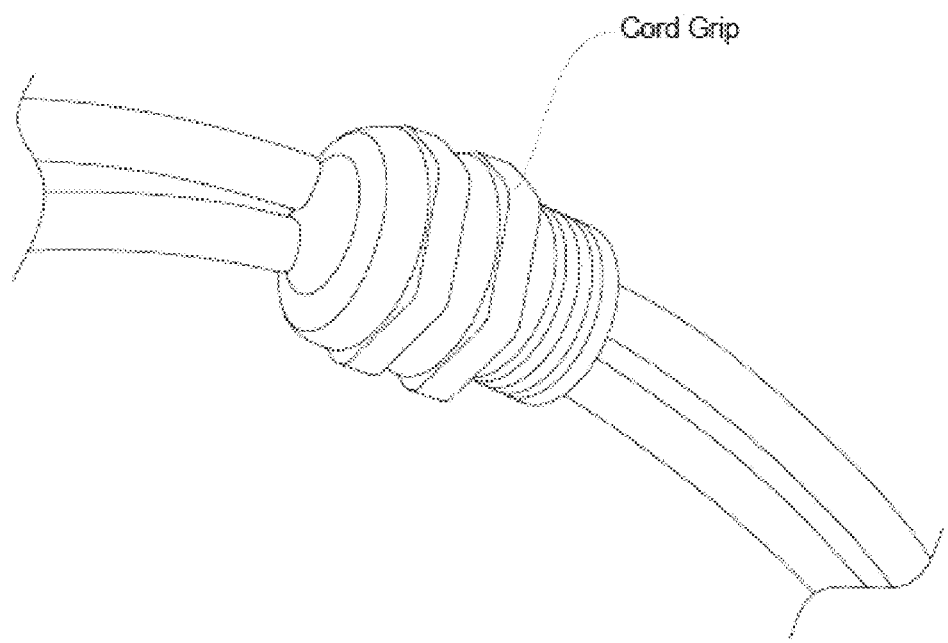
Figure 2A:
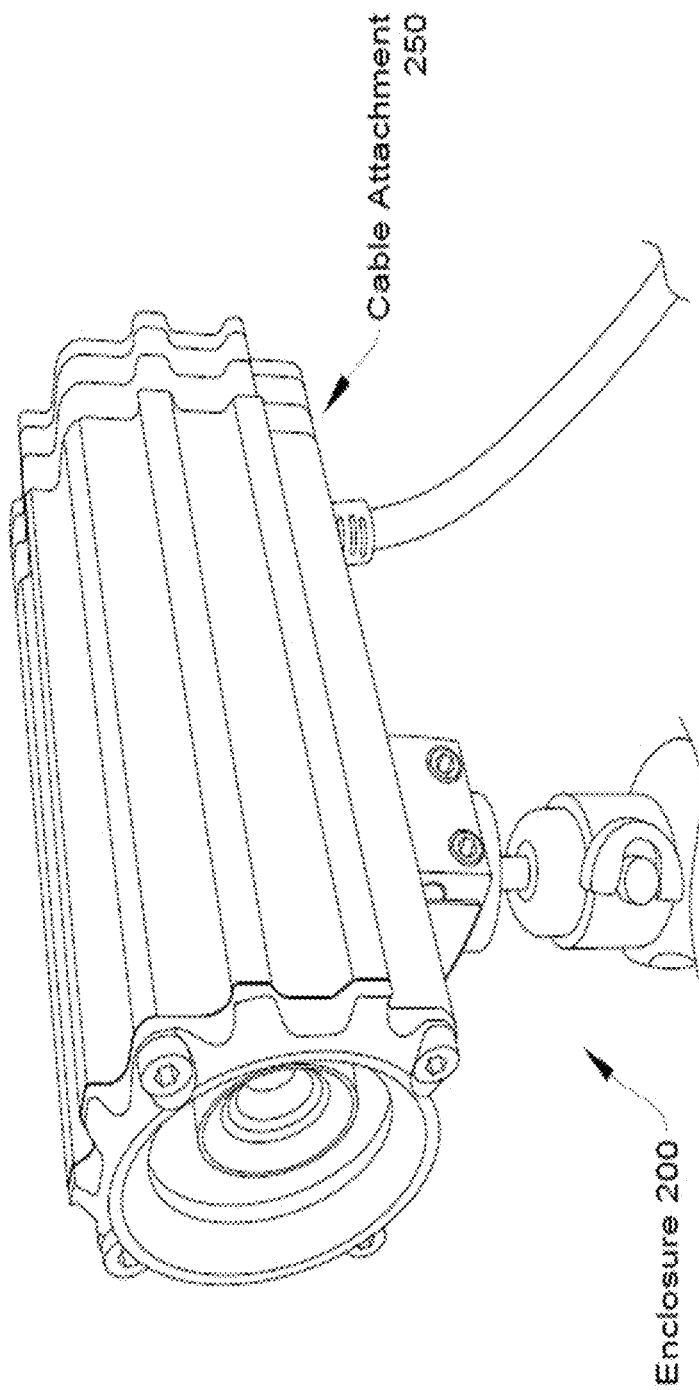
FIG. 2A shows an exemplary camera enclosure having a T-slot surface.
Figure 2B:
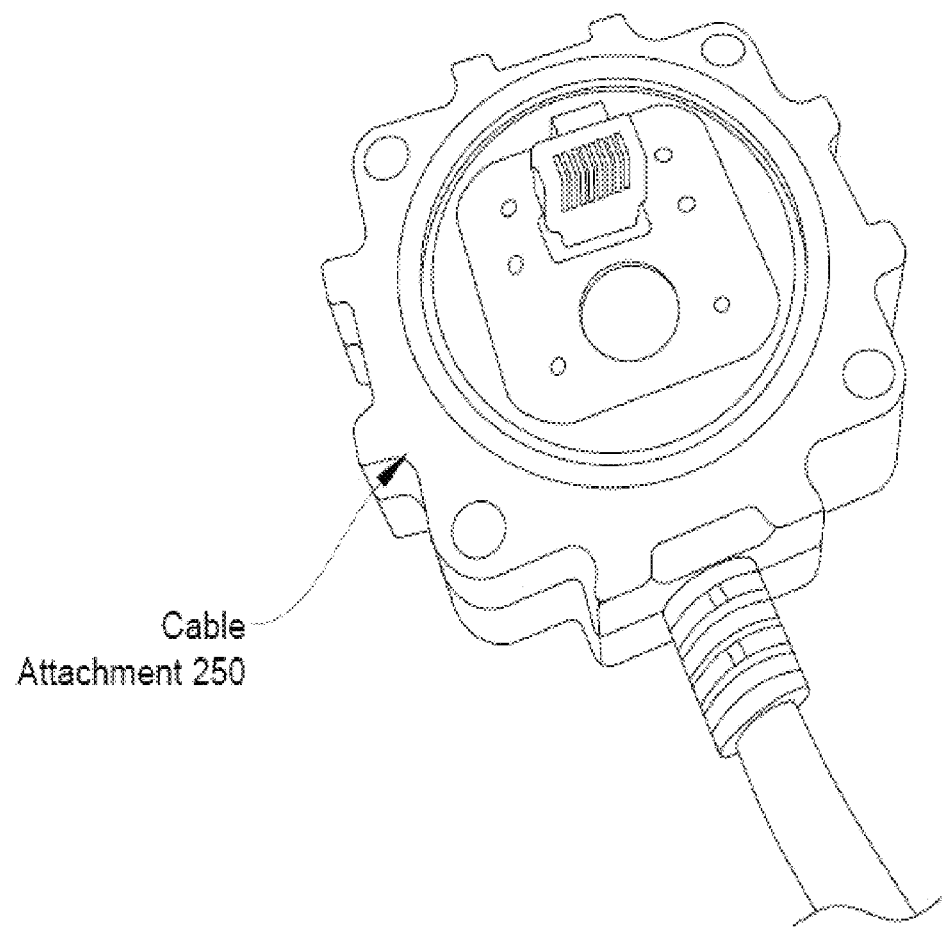
FIG. 2B shows an example cable attachment that matches with the enclosure of FIG. 2A.

From above, it should be apparent that IP-67 compliance requires that that the embodiments herein be both "dust-tight" and also survive "immersion up to 1 m". In response to these and other requirements, FIG. 2A shows an example case/enclosure 200 (shown with T-slot surfaces, although the embodiments herein have many non-T-slot configurations). The enclosure 200 is robust, small, IP67 compliant, has versatile mounting, and has no cord grip. Additionally, FIG. 2B shows an example cable attachment 250 that matches with the enclosure of FIG. 2A, including the same T-slot contours. The enclosure 200 has the advantage of requiring minimal space, and the cable attachment 250 saves additional space by nicely fitting to the back end of the enclosure 200 and routing any necessary connections downward, rather than extending outward from the back end of the enclosure 200 which could increase their chance of being interfered with.

The cable enclosure 250 also has the T-slot rail mounting contours built directly therein. The enclosure 200 shown in FIG. 2A eliminates cord grips, in that the cable attachment 250 (FIG. 2B) is more or less integrated therein, such that there is no need for a cord grip.

A disadvantage of T-slot tubing and why some customers prefer round enclosures 270 over T-slot enclosures 270 is weight, size, and reduction in mass. Further, food applications cannot have crevices or cracks, such as within T-slot tubing. Next, the mounting ring 282 never goes with T-slot tubing, such that round end closures 270 sell much more than T-slot enclosures 270. Still, the embodiments herein accommodate both geometries.

Further advancements are shown in FIGS. 2C, 2D, 2E, 2F, 2G, and 2H, which show detail of various example enclosures 270 which address the above concerns and provide other advantages.

FIG. 2C provides an overview of another example enclosure 270. While the embodiment of enclosure 270 shown in FIG. 2C has a cylindrical enclosure body 290, other types of enclosure bodies could also be implemented. As such, the specific shapes and contours shown in FIG. 2C should not be considered as limiting. Further, the enclosure 270 may or may not have the exact same features as the enclosures 200, 304, and 308, or may have some different features.

From FIG. 2C it is apparent that the enclosure 270 comprises a lens cover 278, the camera itself, an enclosure body 290, a mounting ring 282, a front bezel 278, and an end-cap 286. While FIG. 2C is an exploded view, the enclosure 270 when fully assembled may in an embodiment look like the enclosures 304, 308 shown in FIG. 3.

The lens cover 278 protects a front surface of the camera, sometimes known as a window (which is different from the camera's lens). The front bezel 278 seals the front of the enclosure body 290 and connects the lens cover 278 to the rest of the enclosure 270. Another purpose of the front bezel 278 is to avoid "peephole" issues, that is, be designed to permit as wide and broad a view as possible for the camera. Further, if properly designed, extra lenses can be attached the front bezel 278 rather than to the camera itself. A variety of such extra lenses is shown in FIG. 13. This feature of lens-changing is convenient for making quick adjustments on the machine shop floor, without having to remove and un-mount the camera entirely, which takes much longer.

Figure 2D:
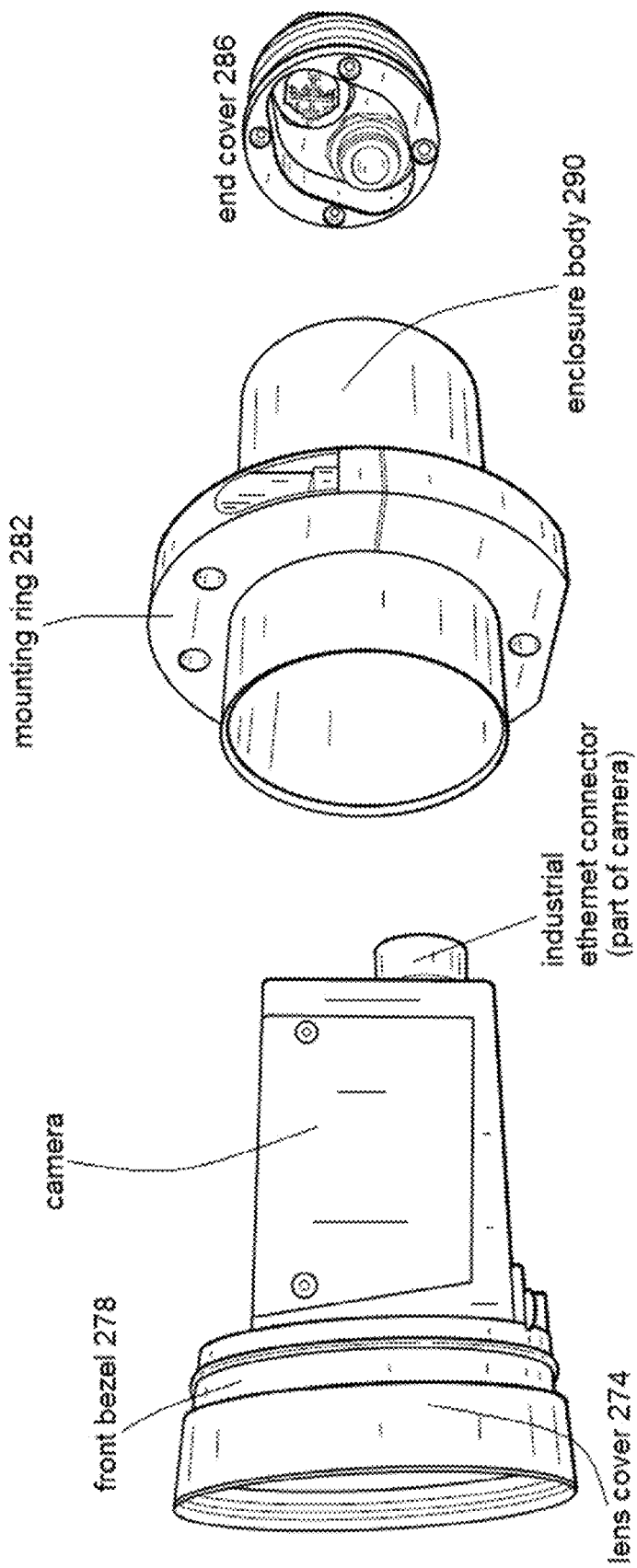

FIG. 2D shows a simplified exploded view of the enclosure 270, showing the camera having an industrial ethernet connector, in an embodiment an X-code M12. The end-cover 286 shows a data connector 291 and an I/O connector 292, which together form an industrial ethernet connector.

Figure 2E:
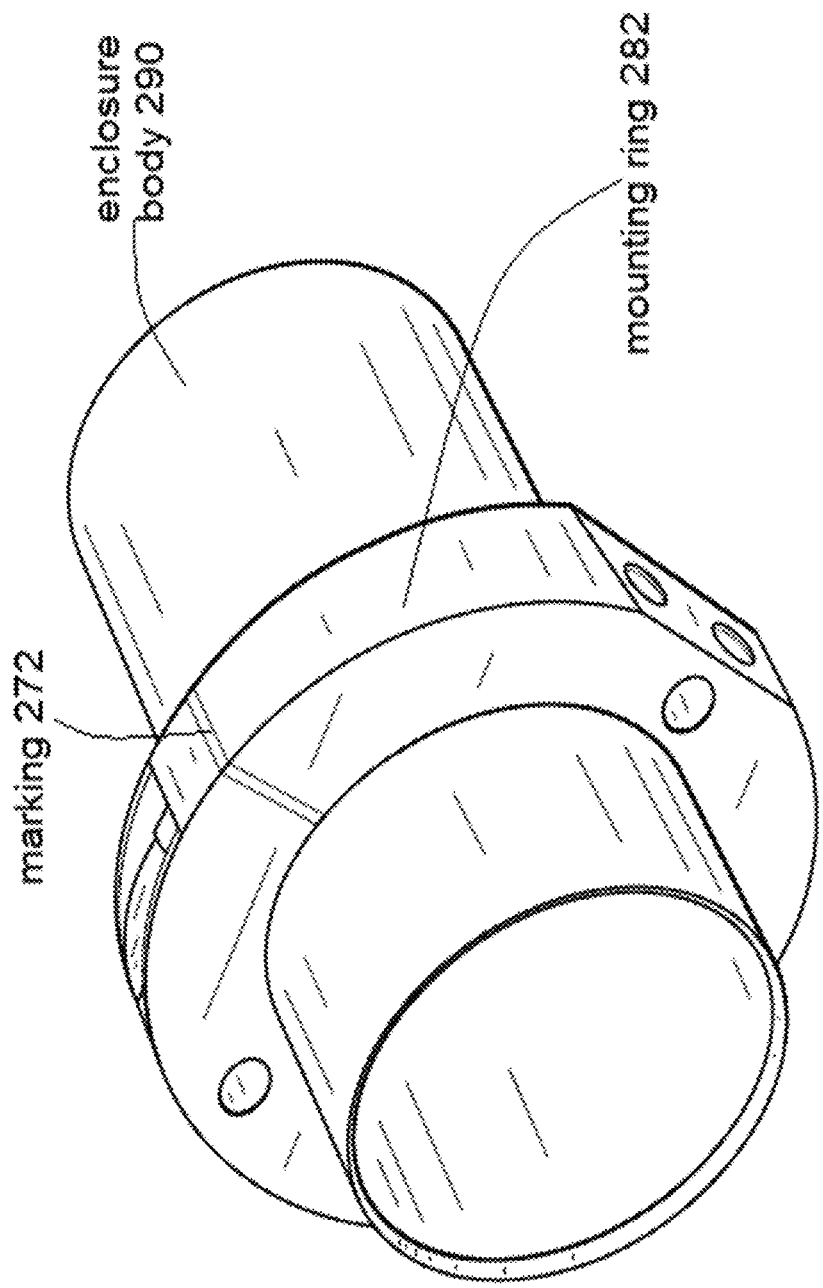

FIG. 2E shows explicit detail of a mounting ring 282, including a marking 272. As stated earlier, when a worker is setting up the camera, and the camera is more or less hidden inside an enclosure 270, it can be helpful to have markings on the enclosure 270 to show where certain features were "set" or configured, e.g. alignment, among other purposes. Another example of this is shown in FIG. 12, in which lettered markings are shown in a linear arrangement along a longitudinal axis of the enclosure 270. Meanwhile, within FIG. 12, numeric markings are shown in a circular arrangement on the mounting ring 282. Additionally, in case a worker needs to quickly obtain information about an enclosure 270 or the camera inside, the enclosure 270 can be fitted with a QR code. Further, the enclosure body 290 shown at least within e.g. FIGS. 2C, 2D, 2F, and 2H can be composed from plastic, nylon, anodized aluminum (e.g. FIG. 14), stainless steel, carbon fiber, and or Delrin.

Figure 2F:
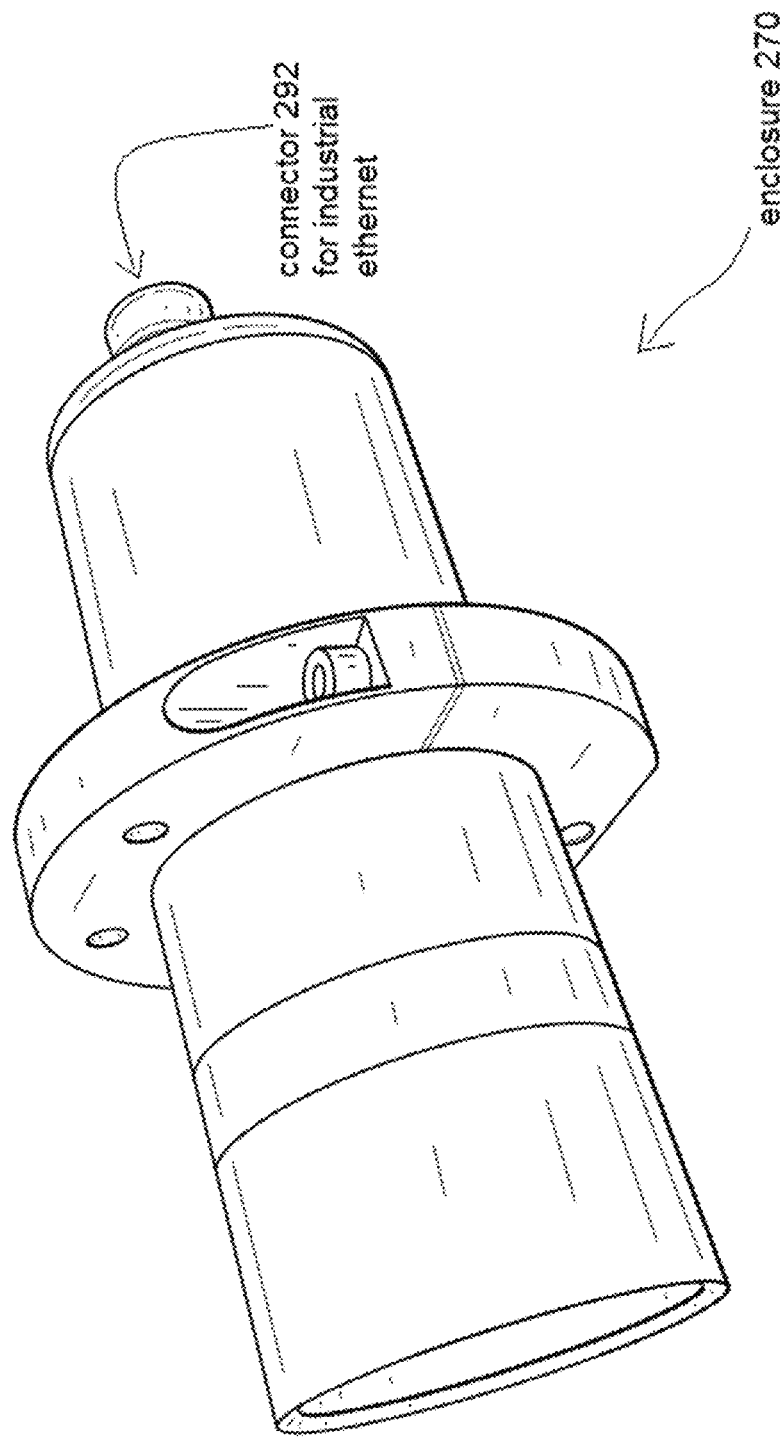
Figure 2G:
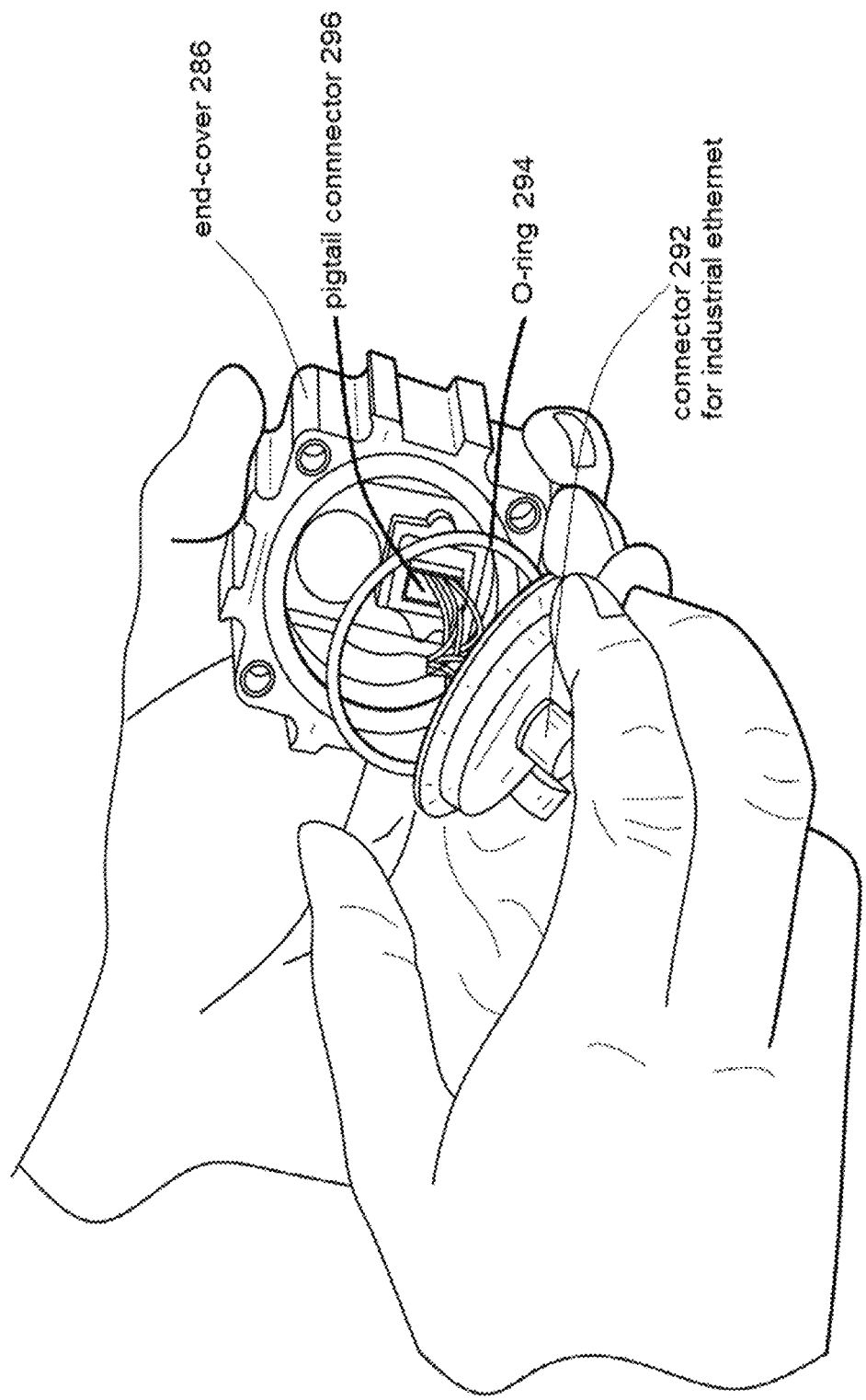
Figure 2H:
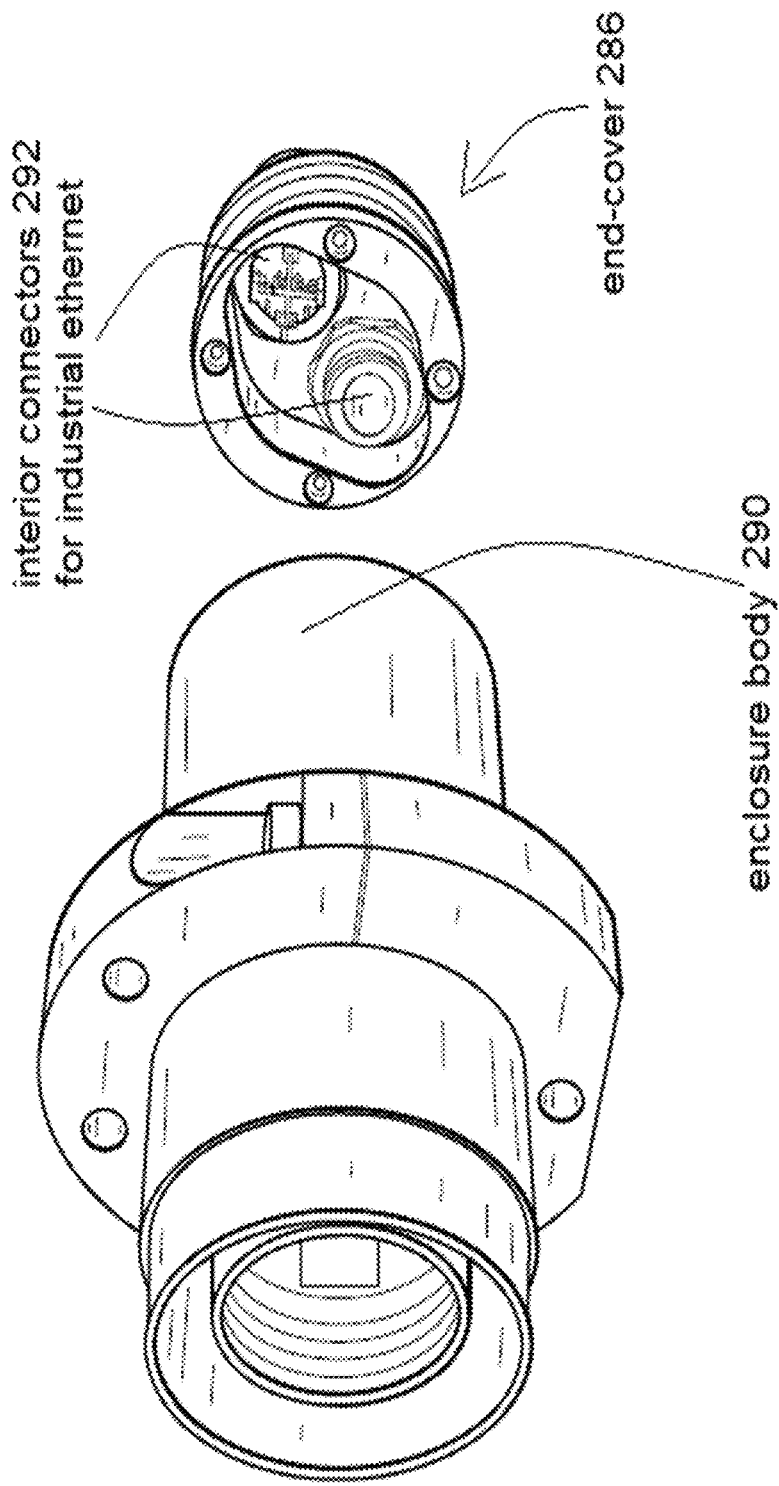

FIG. 2F shows a fully assembled (non-exploded) view of an enclosure 270, in which a connector 292 for industrial ethernet is apparent. Following from FIG. 2F, FIGS. 2G and 2H show detail of an end-cover 286 and specifically the connector 292. From FIG. 2G it is apparent that the camera-facing side of the end-cover 286 is connected to the non-camera-facing side by a pigtail connector 296.

FIG. 4 shows a size comparison of the enclosure 200 shown in FIGS. 2A and 2B. Through proprietary design, as well as use of the cable attachment 250, the enclosure 200 saves a distance 'd' over a comparable (Prior Art) enclosure intended for the same camera. FIGS. 5A and 5B show an enclosure 200 without (FIG. 5A) and with (FIG. 5B) an end-effector 504.

Some customers mount their machine-vision cameras onto a collaborative robot. It can be helpful to attach end-effectors thereto. Examples of this are shown in FIGS. 7A and 7B, in which cubical end-effectors 608 assist in attaching various robot-features. FIG. 7B shows how the cubical end-effector 608 provides a type of pass-through space 704 by which various devices can be operated and attached.

FIG. 8A (Prior Art) is intended to show the challenges in making an enclosure for a 29 mm camera, illustrated using a popular camera called a Genie Nano made by Teledyne Dalsa. One problem is that the Genie Nano is built to accept a larger sensor than typically found in its 29 mm square predecessors. To address this, the embodiments herein can include enclosures 270 which accommodate square shapes, but also can including enclosures which accommodate rectangle shapes.

Other options requested by customers, and accommodated by the embodiments herein, comprise a mounting bracket; an air curtain; a retractable wash down flap; no cord grip; IP 67 compliant; light weight; and a small form factor. The end result is a type of "Swiss Army Knife" of the enclosure industry.

Begin Discussion of End Effector

FIG. 6 shows a variety of end-effectors, including a planar end-effector 604, a cubical end-effector 608, a right-angle end-effector 612, and a hinged end-effector 616. The various end effectors shown herein can have tapped (threaded) holes, and also through holes, and can mate with e.g. Fanuc, or Kuko materials. The grid patterns can connect via a type of domino-mating.

The end effectors discussed herein may be used with the enclosures 200, 270, 304, 308, but may also be used in other contexts. The end effector can be located, for example, wherever a specific robot is manipulating. In the past, putting a vision system where the robot would reach for an item, do something with it, and then take that item to the camera to then check it out, to perform some kind of review of whether the robot accomplished its task. However, that is time-consuming and not always flexible. Consequently, the embodiments herein allow for combining (integrated) existing tooling\robotics and the existing end-effector, which is like a spacer bracket that allows putting both the camera and the tooling on the end of a robot arm (e.g. FIGS. 7A-7B). Specifically, FIG. 7B shows an example of pass-through space 704 which is created by a cubical end-effector 608.

It is possible for an end-user to add vision to the end of the robot, where such vision moves around with the end of the robot. The robot becomes free, that is, operates in free space, as long as the robot can handle the weight and materials needed by the camera. Doing so provides a suitable place to put the camera and saves other fixturing and other things that normally would be necessary to add machine vision to a robot. This end-effector is not separate from the case\enclosure discussed, instead this end effector acts as an accessory for the case\enclosure. The end-effector sits within the case\enclosure, but it must be a specially-modified case\enclosure, that is, being is specially-tooled to accommodate the end-effector.

A popular trend is that more and more devices are now being ganged onto the end of the robots, and yet conventional enclosures do not accommodate this trend. Accordingly, such items as connectors, windows, size variations, accessories, mounting brackets, different kinds of brackets for accessories like lights and things like that for robots all become more available with the end effectors described herein. That's kind of a synopsis of some of the advantages of the end effector embodiments described herein.

Robots often have multiple tools and capabilities, e.g. soldering, riveting, welding, and\or painting. Other robots may do medical tasks such as welding and/or suturing. One embodiment of a case\enclosure has an "air curtain", which blasts air so as to keep the work-surface free of contaminants. Another accessory is a shutter door that closes up over the lens, which can be used in e.g. a wash-down situation, or a painting situation. Using this shutter door, a robot can be doing a painting task, but can close the shutter so as to not be concerned about getting paint onto the camera lens or other surfaces.

Wrap-Up Info Common to Both Case/Enclosures and End-Effectors

Regarding grommet-replacement, replacement of cord-grips, the embodiments herein move the connector to the outside of the enclosure 270. The embodiments herein also re-locate the access ports to be on the outside of the case electrically for the cable connections. Existing enclosures simply cannot be modified to have this feature. An intermediary cable may take the form of a secondary cable that is part of the case/enclosure, either in the form of a permanently fixed, non-movable cable, or some other type of electrical bus.

Thus, there may or may not be an internal cable (that the end-user does not see and does not care about), but a watertight panel-mount connector integral to the case\enclosure will be used. Such a panel-mount connector is part of the structural part of the body itself, integral, integrated, not merely electrically connected but also structurally connected. Such a mechanism makes the entire enclosure smaller, higher quality, less expensive, and more adaptable.

FIG. 8B shows a Prior Art camera called an Imperx Bobcat. FIGS. 9, 14, and 15 show various views of a case/enclosure adaptable to the Imperx Bobcat camera of FIG. 8B. FIG. 14 shows bevels 1404 customized into a front bezel 278, as these bevels 1404 may be needed for an enclosure to work more effectively with a specific camera.

FIG. 9 shows another exploded view of an enclosure 270 that goes beyond the detail of the exploded view in FIG. 2C.

FIGS. 10A and 10B shows a case/enclosure adapted to a camera that is not explicitly stated. Both FIGS. 10A and 10B show a window cover 1004. Remember that a camera has a lens, but the key critical factor to protect is not so much the lens, but a window within the enclosure 270 which protects the lens.

The canopy 1008 exists to protect the enclosure 270, from e.g. sunlight, rain, outdoor types of problems. The canopy 1008 is not IP-67 compliant, but assists the enclosure 270 in remaining IP-67 compliant for longer periods. Remember that T-slot tubing is difficult to clean and disinfect, so that a canopy 1008 can assist in providing extra protection.

FIGS. 11A and 11B shows a case/enclosure adapted to a Matrox GT-R, but with a planar end-effector 604 suitable for attaching various lighting, thus making a type of "light box".

FIG. 12 shows example markings on an attachment ring and an enclosure body. FIG. 13 shows example lenses for attachment not to the camera but to the front bezel of an enclosure.

As stated, FIG. 15 shows an example flowchart detailing the process of fabricating an enclosure 270 for a specific camera, which is an important feature of the embodiments herein. The customization of the enclosures 270 is advantageous because there are so many different sizes of cameras used by customers. FIGS. 16A, 16B, and 16C show detail about the industrial ethernet connector 292, which is broken down into an I/O connector 292 and data connector 291.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing an end effector for use in a machine vision environment, comprising:
   configuring a camera enclosure to have a front bezel attached to an enclosure body;
   configuring the camera enclosure to be suitable for machine-vision cameras; and
   configuring an end effector to be suitable for attaching to the front bezel.

2. The method of claim 1, further comprising:
   manufacturing the end effector separately from the camera enclosure and being detachable from the camera enclosure.

3. The method of claim 2, further comprising:
   forming the end-effector in a planar configuration.

4. The method of claim 3, further comprising:
   configuring the planar end-effector to be suitable attaching lighting, thereby forming a light box.

5. The method of claim 2, further comprising:
   forming the end-effector in a cubical-frame configuration minus a top and bottom, thereby providing four planes of attachment surfaces.

6. The method of claim 5, further comprising:
   the cubical end-effector providing a pass-through space by which various devices can be operated and attached.

7. The method of claim 6, further comprising:
   concatenating a plurality of end effectors where one of the end effectors provides the pass-through space.

8. The method of claim 5, further comprising:
   forming the end effector to have grid patterns in its attachment surfaces; and
   configuring the grid patterns to be connectable to other devices via domino-mating.

9. The method of claim 2, further comprising:
   forming the end-effector in a cubical configuration, thereby providing 5 planes of attachment surfaces.

10. The method of claim 2, further comprising:
    forming the end-effector in a fixed, right-angle configuration.

11. The method of claim 2, further comprising:
    forming the end-effector in an adjustable, hinged configuration.

12. The method of claim 1, further comprising:
    locating the machine-vision camera to be in communication with a collaborative robot having at least one robot arm.

13. The method of claim 12, further comprising:
    an end effector and camera enclosure for adding machine vision to the end of the robot arm, where the machine vision moves around with an end of the robot arm.

14. The method of claim 13, further comprising:
    prior to positioning, weighing and selecting a specific end effector according to whether the robot arm can handle the additional weight and materials.

15. The method of claim 12, further comprising:
    attaching an end effector to the robot arm; and
    attaching a plurality of robotic accessory devices onto the end effector.

16. The method of claim 1, further comprising:
    locating the end effector permanently and non-removably within a specially-modified camera enclosure; and
    configuring the camera enclosure for accommodating the end-effector.

\* \* \* \* \*